United States Patent
Mu et al.

(10) Patent No.: US 9,969,289 B2
(45) Date of Patent: May 15, 2018

(54) SYSTEM AND METHOD FOR MONITORING COORDINATION/CONTROL OF MULTI-OUTPUT INTEGRATED CHARGER FOR ELECTRIC AUTOMOBILE

(71) Applicant: SHANDONG LUNENG INTELLIGENCE TECHNOLOGY CO., LTD, Shandong (CN)

(72) Inventors: Shiyou Mu, Shandong (CN); Antai Zuo, Shandong (CN); Juntian He, Shandong (CN); Xiangjun Meng, Shandong (CN); Chongguang Fu, Shandong (CN); Mengchao Fu, Shandong (CN); Yong Yang, Shandong (CN); Song Chen, Shandong (CN); Zonghui Zhang, Shandong (CN)

(73) Assignee: SHANDONG LUNENG INTELLIGENCE TECHNOLOGY CO., LTD, Shandong (CN)

( * ) Notice: Subject to any disclaimer, the term of this patent is extended or adjusted under 35 U.S.C. 154(b) by 192 days.

(21) Appl. No.: 14/917,777

(22) PCT Filed: Oct. 21, 2014

(86) PCT No.: PCT/CN2014/088995
§ 371 (c)(1),
(2) Date: Mar. 9, 2016

(87) PCT Pub. No.: WO2015/039632
PCT Pub. Date: Mar. 26, 2015

(65) Prior Publication Data
US 2016/0221464 A1    Aug. 4, 2016

(30) Foreign Application Priority Data
Sep. 17, 2013 (CN) .......................... 2013 1 0425890

(51) Int. Cl.
*H02J 7/00* (2006.01)
*B60L 11/00* (2006.01)
(Continued)

(52) U.S. Cl.
CPC ......... *B60L 11/1848* (2013.01); *B60L 3/0069* (2013.01); *B60L 3/04* (2013.01);
(Continued)

(58) Field of Classification Search
CPC ............ B60L 11/1848; B60L 11/11816; B60L 11/1844; B60L 11/1846; B60L 11/1861;
(Continued)

(56) References Cited

U.S. PATENT DOCUMENTS 8,332,342 B1 * 12/2012 Saha .................. G01R 31/3679
706/45
2004/0095374 A1 * 5/2004 Jojic ....................... G06T 7/215
715/716
(Continued)

FOREIGN PATENT DOCUMENTS

| CN | 201674251 | 12/2010 |
| CN | 201699445 | 1/2011 |

(Continued)

OTHER PUBLICATIONS

Extended European Search Report dated May 29, 2017, in European Patent Appl. No. 14845506.6.
(Continued)

*Primary Examiner* — Phallaka Kik
(74) *Attorney, Agent, or Firm* — Vierra Magen Marcus LLP (57) ABSTRACT

A system and method for monitoring coordination/control of a multi-output integrated charger for electric automobiles, comprising a voltage/current demand collection module, an optimal-policy design module, and a policy execution mod-
(Continued)

ule. The voltage/current demand collection module transmits demand information to the optimal-policy design module; the optimal-policy design module provides policy design results to the policy execution module; the policy execution module feeds back execution results to the optimal-policy design module; and, the optimal-policy design module feeds back the results to the voltage/current demand collection module. By means of real-time selection of an optimal power output policy, the present invention solves the safety, timeliness, and versatility issues concerning demand for power, voltage, and current during the charging process.

9 Claims, 2 Drawing Sheets (51) Int. Cl.
- *B60L 3/00* (2006.01)
- *B60L 11/18* (2006.01)
- *B60L 3/04* (2006.01)
- *B60L 3/12* (2006.01)

(52) U.S. Cl.
CPC ............ *B60L 3/12* (2013.01); *B60L 11/1816* (2013.01); *B60L 11/1844* (2013.01); *B60L 11/1846* (2013.01); *B60L 11/1861* (2013.01); *H02J 7/00* (2013.01); *B60L 2240/36* (2013.01); *B60L 2240/80* (2013.01); *B60L 2250/10* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .. B60L 3/0069; B60L 3/04; B60L 3/12; B60L 2240/36; B60L 2240/80; B60L 2250/10; H02J 7/00; Y02T 10/7005; Y02T 10/7044; Y02T 10/705; Y02T 90/121; Y02T 90/128; Y02T 90/14; Y02T 90/163; Y02T 90/169; Y04S 30/14
USPC .................................................. 320/109, 104
See application file for complete search history.

(56) References Cited

U.S. PATENT DOCUMENTS

| | | | |
|---|---|---|---|
| 2008/0048619 A1 | 2/2008 | Yoshida | |
| 2010/0134067 A1 | 6/2010 | Baxter et al. | |
| 2010/0218108 A1* | 8/2010 | Crabtree | G06Q 50/06 715/738 |
| 2010/0306033 A1* | 12/2010 | Oved | G06Q 10/06375 705/7.37 |
| 2010/0332373 A1* | 12/2010 | Crabtree | G06Q 40/04 705/37 |
| 2011/0130885 A1* | 6/2011 | Bowen | B60L 3/12 700/291 |
| 2011/0144844 A1* | 6/2011 | Ishibashi | B60L 11/1846 701/22 |
| 2011/0221392 A1* | 9/2011 | Gale | G01R 31/3662 320/109 |
| 2012/0041855 A1* | 2/2012 | Sterling | B60L 3/0046 705/34 |
| 2012/0101653 A1* | 4/2012 | Tran | G01D 4/004 700/296 |
| 2012/0139489 A1* | 6/2012 | Gaul | B60L 11/1816 320/109 |
| 2012/0197693 A1* | 8/2012 | Karner | G06Q 20/102 705/14.1 |
| 2013/0121229 A1* | 5/2013 | Vare | H04H 20/22 370/312 |
| 2013/0208587 A1* | 8/2013 | Bala | H04W 16/14 370/230 |
| 2013/0316675 A1* | 11/2013 | Luna | H04W 4/26 455/408 |
| 2014/0374475 A1* | 12/2014 | Kallfelz | H04Q 9/00 235/375 |
| 2015/0094968 A1* | 4/2015 | Jia | G06Q 40/04 702/60 |
| 2015/0286759 A1* | 10/2015 | Rehtanz | G06F 17/5022 703/18 |
| 2015/0373554 A1* | 12/2015 | Freda | H04W 16/14 455/450 |
| 2016/0227471 A1* | 8/2016 | De Foy | H04W 4/001 |
| 2018/0049300 A1* | 2/2018 | Recker | H05B 37/0218 |

FOREIGN PATENT DOCUMENTS

| | | |
|---|---|---|
| CN | 201877858 | 6/2011 |
| CN | 102130478 | 7/2011 |
| CN | 102208824 | 10/2011 |
| CN | 102315674 | 1/2012 |
| CN | 102447288 | 5/2012 |
| CN | 102710000 | 10/2012 |
| CN | 202632088 | 12/2012 |
| CN | 202678987 | 1/2013 |
| CN | 103475059 | 12/2013 |

OTHER PUBLICATIONS

PCT International Search Report dated Jan. 21, 2015, PCT Patent Application No. PCT/CN2014/088995.
English Abstract of Chinese Patent Application No. CN102130478.
English Abstract of Chinese Patent Application No. CN102208824.
English Abstract of Chinese Patent Application No. CN102315674.
English Abstract of Chinese Patent Application No. CN102447288.
English Abstract of Chinese Patent Application No. CN102710000.
English Abstract of Chinese Patent Application No. CN103475059.
English Abstract of Chinese Patent Application No. CN201674251.
English Abstract of Chinese Patent Application No. CN201699445.
English Abstract of Chinese Patent Application No. CN201877858.
English Abstract of Chinese Patent Application No. CN202632088.
English Abstract of Chinese Patent Application No. CN202678987.
Chinese Office Action dated Dec. 9, 2014, Chinese patent application No. 201310425890.6, English summary of the 1st Office Action.

* cited by examiner

SYSTEM AND METHOD FOR MONITORING COORDINATION/CONTROL OF MULTI-OUTPUT INTEGRATED CHARGER FOR ELECTRIC AUTOMOBILE

This application is a National Stage application of PCT international application PCT/CN2014088995, filed on Oct. 21, 2014 which claims priority to Chinese Patent Application No. 201310425890.6 titled "System and method for monitoring multi-output coordination control integrated charger of electric vehicle" and filed with the Chinese State Intellectual Property Office on Sep. 17, 2013, both of which are incorporated herein by reference in their entireties.

FIELD

The present disclosure relates to the field of vehicle charging technology, and in particular to a system and method for monitoring a multi-output coordination control integrated charger of an electric vehicle.

BACKGROUND

With challenges of energy demands and resource environment to the human being, the amount of electric vehicles continues to increase, and the quantity of charging infrastructure matching the electric vehicles also increases. Influences on the personnel security and power grid caused by charging the electric vehicles are attended. Thus, a system for securely and reliably monitoring an electric vehicle charger is very important.

A conventional system for monitoring an electric vehicle charger tends to routine acquisitions and basic control, which does not consider monitoring strategies based on operating states and have not a process for choosing an optimal strategy. There is no flexible and reasonable charging solution and protection scheme for the issues encountered in a charging process, which results in a big security risk in the field of monitoring an electric vehicle charging station.

Solutions for monitoring an electric vehicle charger are provided in the Chinese patent (Publication No. CN202678987U, titled "电动汽车充电机的监控装置") published by the Chinese State Intellectual Property Office on January, 2013, in the Chinese patent (Publication No. CN201699445U, titled "一种用于电动汽车充电站的充电机监控装置") published by the Chinese State Intellectual Property Office on Jan. 5, 2011, and the Chinese patent (Publication No. CN202632088U, titled "基于云计算平台的电动汽车充电机监控装置") published by the Chinese State Intellectual Property Office on Dec. 26, 2012. Through analysis, the published solution of monitoring a conventional electric vehicle charging station has the following technical issues.

1. In conventional technology, it is not considered that the multi-output coordination control charger and charging station of electric vehicle are integrated, and no system and method for monitoring an integrated charger is involved. A conventional monitoring system can only acquire data at one power output port of the charger, rather than data at each of multiple power output ports. Furthermore, no process for processing the data at each of the multiple power output ports is mentioned.

2. The charger mentioned above does not have a multi-output function, and does not provide multiple power output ports. When multiple electric vehicles wants to be charged at a station with a small number of charging devices, the electric vehicles need to wait a long time, thereby causing issues such as a long scheduling time for the electric vehicles and low utilization of the charger.

3. The charging solution has a poor customization strategy function. Factors in the work of the charger are not divided based on operating states. Various factors in different operating states just be acquired routinely and a basic control is performed, without comprehensive evaluation and analysis. Furthermore, an optimal charging solution and a protection scheme are not provided in time in response to the evaluation and analysis result. The untimely and inaccurate handling of problems result in erroneous judgments, false alarms, and repetitive operations, which implicitly increases the workload of artificial trouble-shooting.

SUMMARY

In view of this, a system and a method for monitoring a multi-output coordination control integrated charger of an electric vehicle are provided, with a strong self-protection ability.

To achieve the above objective, following technical solutions are provided.

A system for monitoring a multi-output coordination control integrated charger of an electric vehicle is provided. The system includes:

a central control layer, configured to obtain an operation on a user interface and query system information;

a data processing layer, configured to customize a specific application, where the specific application includes: strategy customization, system alarm, billing, data model, system operating log;

a data communication layer, configured to establish a communication link, and transmit and receive data; and a device layer, configured to acquire data from a charging module and multiple power ports of the multi-output coordination control integrated charger of the electric vehicle, and distribute data on multiple paths to the data processing layer through the data communication layer;

where the data processing layer includes:

an optimal strategy customization module, configured to form an optimal strategy based on a charging requirement and an activated status of the charging module, and issue the optimal strategy to a related module;

a system alarm processing module, configured to collect and process various alarm information during an operation of the system, and notify a related module to process the alarm in a real time way;

a billing processing module, configured to record a fee generated by the system in a process of charging;

a data model module, configured to process data interaction; and read and write test point data, where the test point data includes a mount of data and signal, where the data model module is configured to obtain data acquired by a charging requirement acquiring module; and issue control data to a charging strategy executing module;

an operating log module, configured to collect system operation status, and provide a basis of a system maintenance, where a log is divided into four levels comprising a debug log, a general information log, an alarm information log, and an error information log;

the charging requirement acquiring module, configured to obtain a required voltage and current in a real time way, where the charging requirement acquiring module obtains requirement information of BMS of the charged vehicle in a real time way through a CAN bus, and provides a real-time output of the system and a system status variable; and a charging strategy executing module configured to execute an optimal output strategy, where the charging strategy executing module monitors and controls a charging module in a real time way through a CAN bus, a RS485 bus, or a RS422 bus, and provides real-time data of the charging module; if a failure comprising under-voltage, over-current, short circuit and overheating happens to the charging module, a failure alarm signal is outputted.

The optimal strategy customization module has four operating states including a stop state for inspection, a state of starting charging, an inspection state during charging, and a state of stopping charging.

In the stop state for inspection, whether the charging module is activated or inactivated is monitored, and a maximum available output voltage and current is calculated in a real time way.

In the state of starting charging, a charging module is provided to perform a charging operation, according to a required voltage, a required current and a maximum output voltage and current of the charger at a present moment, where in the state of starting charging, a function of starting a single module and a function of starting multiple modules are provided.

In the inspection state during charging, a situation of the charging module in an operating process is monitored in a real time way.

The inspection state during charging includes the following four situations:

in a case that the failure alarm signal of the charging module is received, and it is determined to stop the failed charging module by analyzing and processing the failure alarm signal, the charging module to be stopped is switched into the state of stopping charging, and a new voltage and current distribution strategy is provided to the charging strategy executing module;

in a case that a maximum output of an activated module does not meet a requirement, an available standby charging module is provided;

in a case that minimum output power of the activated module is greater than required power, a part of output modules is stopped; and in a case that the output power is not equal to the required power, the output power is dynamically regulated in a real time way.

In the state of stopping charging, a charging operation of a charging module, which is providing an output, is stopped.

A method for monitoring a multi-output coordination control integrated charger of an electric vehicle is provided. The method includes:

step 1), initializing system data, where system parameters and configuration data are loaded and parsed;

step 2), loading sub-functions, where the sub-functions are configured to implement an operating log module, a data model module, a system alarm processing module, a billing processing module, a charging requirement acquiring module, and a charging strategy executing module;

where the operating log module records a system operating status, abnormal data, and abnormal process operation during an operation in a real time way; and a log is divided into four levels comprising a debug log, a general information log, an alarm information log, and an error information log;

the data model module reads and writes test point data in a real time way, where the test point data includes a mount of data and signal acquired by each of devices of a device layer;

the system alarm processing module collects and processes various alarm information during the operation of the system, notifies a related module to process the alarm in a real time way, and analyzes and processes abnormal data and abnormal four-remote data during the operation of the system; and the billing processing module records a fee generated by the system in a process of charging;

and step 3), customizing an optimal strategy, where a charging requirement acquiring module transmits a charging requirement to an optimal strategy customization module, the optimal strategy customization module provides a strategy customization result to a charging strategy executing module, the charging strategy executing module feeds back an execution result to the optimal strategy customization module, and the optimal strategy customization module feeds back the result to the charging requirement acquiring module; and where the optimal strategy customization module has four operating states including a stop state for inspection, a state of starting charging, an inspection state during charging, and a state of stopping charging, the optimal strategy customization module generates an optimal strategy by analyzing data provided by a data model module and a system alarm processing module, and performs a function of optimal strategy customization; in a case that it is determined that the operating state is switched, the operating states are switched in response to a determination result of switching the operating state; an interface of a system log module is called, and an operating log is recorded; and a billing processing module is called, and a charging record is generated.

The inspection state during charging of the optimal strategy customization module, includes:

step (1), starting an inspection during charging;

step (2), determining whether there is an alarm module, and going to step (4) in the case that there is the alarm module; and going to step (3) in the case that there is not the alarm module;

step (3), sending a single module stop command; determining whether a single module is successfully stopped; going to step (4) in the case that the single module is successfully stopped; and going to step (13) in the case that the single module is not stopped successfully;

step (4), determining whether an output of an activated module is not greater than a requirement; going to step (6) in the case that the output of the activated module is not greater than the requirement; and going to step (5) in the case that the output of the activated module is greater than the requirement;

step (5), determining whether a single inactivated charging module is available; going to step (7) in the case that the single inactivated charging module is available; and going to step (13) in the case that no single inactivated charging module is available;

step (6), determining whether a real-time output is greater than the requirement; and going to step (8) in the case that the real-time output is greater than the requirement;

step (7), determining whether the single module is successfully activated; going to step (6) in the cast that the single module is successfully activated; and going to step (13) in the case that the single module is not successfully activated;

step (8), determining whether the single module is not required to be inactivated; inactivating the single module in the case that the single module is required to be inactivated; and going to step (9) in the case that the single module is not required to be inactivated;

step (9), determining whether it is not required to reset the output; and going to step (11) in the case that it is not required to reset the output; setting a voltage and a current and going to step (12) in the case that it is required to reset the output;

step (10), determining whether the single module is successfully inactivated, and going to step (9) in the case that the single module is successfully inactivated; going to step (13) in the case that the single module is not inactivated successfully;

step (11), determining whether the inspection during charging is continued; going to step (13) in the case that the inspection during charging is not continued;

step (12), determining whether the setting is successful; going to step (11) in the case that the setting is successful; going to step (13) in the case that the setting is not successful; and step (13), stopping charging.

Beneficial effects of the disclosure are as follows.

1. In the application, the multi-output coordination control charger and charging station of electric vehicle are integrated. A system and method for monitoring an integrated charger are provided, in which data can be acquired at multiple power output ports of the charger. Optimal control strategy for data at multiple power output ports is provided.

2. The above charging solution has a strong strategy customization function. Factors in the work of the charger are clearly divided based on operating states of the charger. Various factors in different operating states are evaluated and analyzed comprehensively. An optimal charging solution and protection scheme may be timely provided based on the evaluated and analyzed result. Problems may be performed timely and accurately, and thus erroneous judgments, false alarms, and repetitive operations can be avoided, and the workload of artificial trouble-shooting is reduced.

3. A power intelligent match is adopted to regulate a voltage and current of a module and an on-line or off-line status of each of multiple modules, and to timely choose an optimal power output strategy. In this way, it is ensure the security, timeliness and diversity of power, voltage and current in a process of charging of the electric vehicle.

DETAILED DESCRIPTION

To make objectives, features, and advantages of the disclosure more obvious, embodiments are described in detail in conjunction with drawings.

The disclosure is illustrated in conjunction with the drawings and embodiments.

Figure 1:
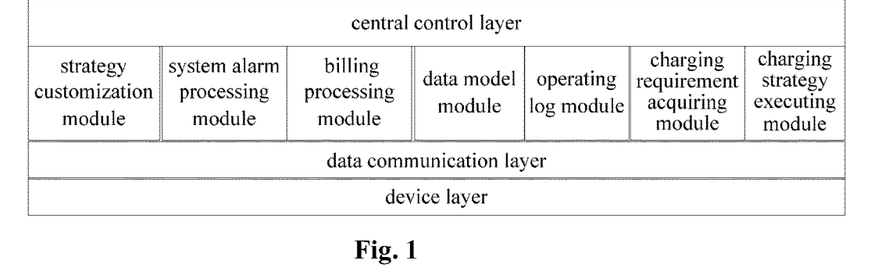
FIG. 1 is a system architecture diagram according to the disclosure.

FIG. 1 is a diagram of a system for monitoring multi-output coordination control integrated charger of electric vehicle according to the disclosure.

The system includes the follows.

A central control layer is configured to obtain an operation on a user interface operation and query system information.

A data processing layer is configured to customize a specific application, where the specific application includes: strategy customization, system alarm, billing, data model, system operating log.

A data communication layer is configured to establish a communication link, and transmit and receive data.

A device layer is configured to acquire data from a charging module and multiple output power ports of the multi-output coordination control integrated charger of the electric vehicle, and distribute data on multiple paths to the data processing layer through the data communication layer.

The data processing layer includes:

an optimal strategy customization module, configured to form an optimal strategy based on a charging requirement and an online status of the charging module, and issue the optimal strategy to a related module;

a system alarm processing module, configured to collect and process various alarm information during an operation of the system, and notify a related module to process the alarm in a real time way;

a billing processing module, configured to record a fee generated by the system in a process of charging;

a data model module, configured to process data interaction; and read and write test point data, where the test point data includes a mount of data and signal, where the data model module is configured to obtain data acquired by a charging requirement acquiring module; and issue the obtained data to a charging strategy executing module; and an operating log module, configured to collect system operation status, and provide a basis of a system maintenance, where a log is divided into four levels, i.e., a debug log, a general information log, an alarm information log, and an error information log.

The charging requirement acquiring module is configured to obtain a required voltage and current in a real time way. The charging requirement acquiring module obtains requirement information of BMS of the charged vehicle in a real time way through a CAN bus, and provides a real-time output of the system and a system status variable.

The charging strategy executing module is configured to execute an optimal output strategy. The charging strategy executing module monitors and controls the charging module in a real time way through a CAN bus, RS485 bus, RS422 bus or the like, and provides real time data of the charging module. If a failure such as under-voltage, overcurrent, short circuit, and overheating happens to the charging module, a failure alarm signal is outputted.

The optimal strategy customization module has four operating states, i.e., a stop state for inspection, a state of starting charging, an inspection state during charging, and a state of stopping charging.

In the stop state for inspection, whether the charging module is activated or inactivated is monitored, and a maximum available output voltage and current is calculated in a real time way.

In the state of starting charging, a charging module is provided to perform a charging operation, according to a required voltage, a required current and the maximum output voltage and current of the charger at a present moment. In the state of starting charging, a function of starting a single module and a function of starting multiple modules are provided.

In the inspection state during charging, a situation of the charging module in an operating process is monitored in a real time way.

The inspection state during charging includes the following four situations:

In the case that the failure alarm signal of the charging module is received, and it is determined to stop the failed charging module by analyzing and processing the failure alarm, the charging module to be stopped is switched into the state of stopping charging, and a new voltage and current distribution strategy is provided to the charging strategy executing module;

in the case that a maximum output of an activated module does not meet a requirement, an available standby charging module is provided;

in the case that a minimum output power of the activated module is greater than the required power, a part of output modules is stopped; and in the case that the output power is not equal to the required power, the output power is dynamically regulated in a real time way.

In the state of stopping charging, a charging operation of a charging module, which is providing an output, is stopped.

Figure 2:
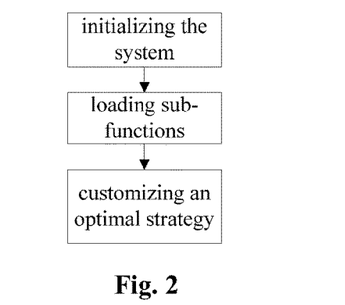
FIG. 2 is a work flow chart according to the disclosure.

FIG. 2 is a diagram of a method for monitoring a multi-output coordination control integrated charger of an electric vehicle. The method mainly includes the following steps.

A method for monitoring a multi-output coordination control integrated charger of an electric vehicle. The method mainly includes the following steps.

A method for monitoring a multi-output coordination control integrated charger of an electric vehicle. The method mainly includes the following steps.

In step 1), system data is initialized, where system parameters and configuration data are loaded and parsed.

In step 2), sub-functions are loaded. The sub-functions are configured to implement an operating log module, a data model module, a system alarm processing module, a billing processing module, a charging requirement acquiring module, and a charging strategy executing module.

The operating log module records a system operating status, abnormal data, and abnormal process operation during an operation in a real time way. The log is divided into four levels including a debug log, a general information log, an alarm information log, and an error information log.

The data model module reads and writes test point data in a real time way, where the test point data includes a mount of data and signal acquired by each of devices of a device layer.

The system alarm processing module collects and processes various alarm information during an operation of the system, and notifies a related module to process the alarm in a real time way, and analyzes and processes abnormal data and abnormal four-remote data during the operation of the system.

The billing processing module records a fee generated by the system in a process of charging.

In step 3), an optimal strategy is customized. An optimal strategy customization module has four operating states, i.e., a stop state for inspection, a state of starting charging, an inspection state during charging, and a state of stopping charging. The optimal strategy customization module generates an optimal strategy by analyzing data provided by a data model module and a system alarm processing module, and performs a function of optimal strategy customization. Then, in a case that it is determined that the operating state is switched, the operating states are switched in response to a determination result of switching the operating state; an interface of a system log module is called, and an operating log is recorded; and a billing processing module is called, and a charging record is generated.

Figure 3:
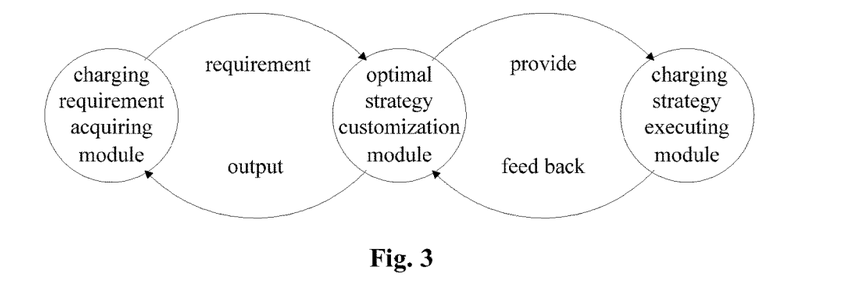
FIG. 3 is a diagram of charging data interaction.

As shown in FIG. 3, the charging requirement acquiring module transmits a requirement to an optimal strategy customization module. The optimal strategy customization module provides a strategy customization result to a charging strategy executing module. The charging strategy executing module feeds back an execution result to the optimal strategy customization module. The optimal strategy customization module feeds back the result to the charging requirement acquiring module.

Figure 4:
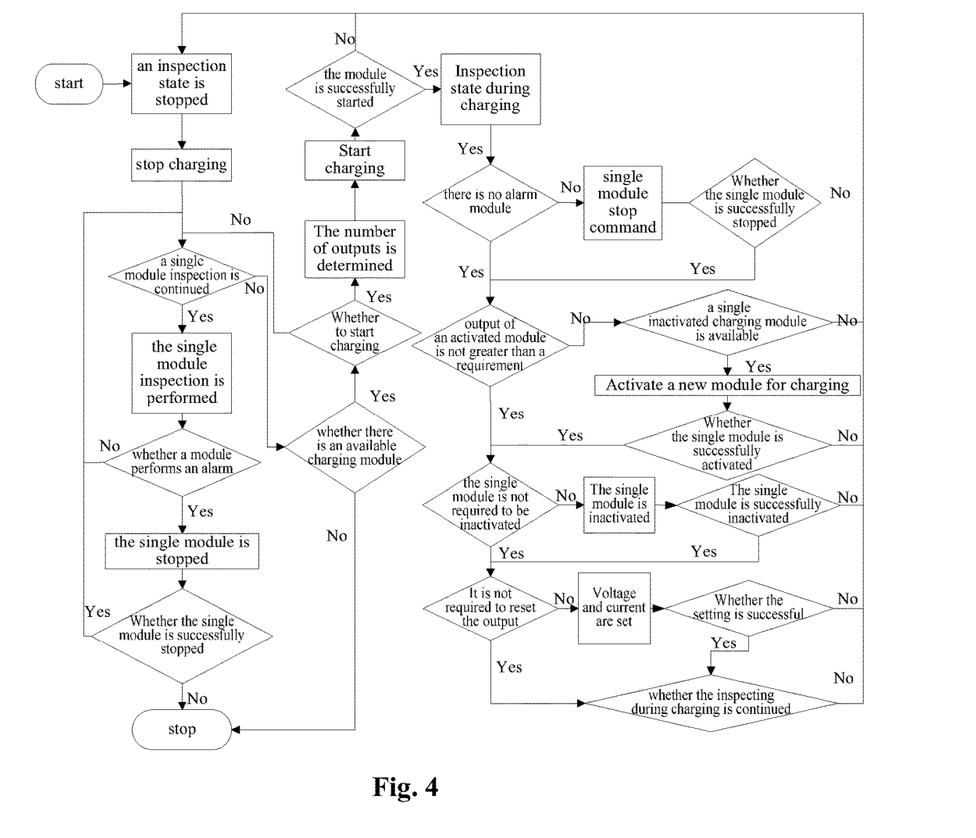
FIG. 4 is a work flow chart of four operating states of an optimal strategy customizing module according to the disclosure.

As shown in FIG. 4, the four operating states of the optimal strategy customization module include follow steps.

In step (1), start.

In step (2), an inspection state is stopped.

In step (3), all modules are stopped from charging.

In step (4), it is determined whether a single module is to be inspected; and in case of positive determination, the single module is inspected in the case that the single module is determined to be inspected, and the process goes to step (18); and the process goes to step (5) in the case that the single module is not determined to be inspected.

In step (5), it is determined whether there is an available charging module; the process goes to step (6) in the case that there is the available charging module; and the process goes to step (20) in the case that there is not the available charging module.

In step (6), it is determined whether charging is started; a number of power output ports is determined based on a user setting or data acquired by a data model module in the case that the charging is determined to be started, and charging is started; and the process goes back to step (4) in the case that the charging is not determined to be started.

In step (7), it is determined whether the module is successfully started; the inspection state during charging is entered in the case that the module is successfully started, and the process goes to step (8); and the process goes back to step (2) in the case that the module is not started successfully.

In step (8), it is determined whether there is not an alarm module; the process goes to step (10) in the case that there is not the alarm module; a single module stop command is executed, and the process goes to step (9) in the case that there is the alarm module.

In step (9), it is determined whether the single module is successfully stopped; the process goes to step (10) in the case that the single module is successfully stopped; the process goes back to step (2) in the case that the single module is not stopped successfully.

In step (10), it is determined whether an output of an activated module is not greater than a requirement; the process goes to step (13) in the case that the output of the activated module is not greater than the requirement; and the process goes to step (11) in the case that the output of the activated module is not greater than the requirement.

In step (11), it is determined whether a single inactivated charging module is available; the single inactivated charging module is started for charging in the case that the single inactivated charging module is available, and the process goes to step (12); and the process goes back to step (2) in the case that the single inactivated charging module is not available.

In step (12), it is determined whether the single module is successfully activated; the process goes to step (13) in the case that the single module is successfully activated; the process goes back to step (2) in the case that the single module is not activated successfully.

In step (13), it is determined whether the single module is not required to be inactivated; the process goes to step (15) in the case that the single module is not required to be inactivated; and the single module is inactivated, and the process goes to step (14) in the case that the single module is required to be inactivated.

In step (14), it is determined whether the single module is successfully inactivated;

the process goes to step (15) in the case that the single module is successfully inactivated; the process goes back to step (2) in the case that the single module is not inactivated successfully.

In step (15), it is determined whether it is not required to reset the output; the process goes to step (17) in the case that it is not required to reset the output; a voltage and current are set, and the process goes to step (16) in the case that it is required to reset the output.

In step (16), it is determined whether the output is reset successfully; the process goes to step (17) in the case that the output is reset successfully; and the process goes back to step (2) in the case that the output is not reset successfully.

In step (17), it is determined whether the inspection during charging is continued; the process goes to step (8) in the case that the inspection during charging is continued; the process goes back to step (2) in the case that the inspection during charging is not continued.

In step (18), it is determined whether the module raises an alarm; the single module is stopped and the process goes to step (19) in the case the module raises the alarm; and the process goes back to step (4) in the case that the module does not raise the alarm.

In step (19), it is determined whether the single module is successfully inactivated; the process goes back to step (4) in the case that the single module is successfully inactivated; the process goes to step (20) in the case that the single module is not inactivated successfully.

In step (20), the single module is stopped.

The above description is just preferable embodiments of the disclosure, which are not to limit the disclosure in any form. Although the disclosure is illustrated with preferable embodiments mentioned above, the preferable embodiments are not intended to limit the disclosure. Those skilled in the art can make some possible changes and modifications to the technical solution of the disclosure, based on the described method and technical solution without departing from a scope of the technical solution of the disclosure. Therefore, any simple modification, substitution or changes to the embodiments based on the technical essence of the disclosure without departing from a scope of the technical solution of the disclosure fall within the protection scope of the application.

The invention claimed is:

1. A method for monitoring a multi-output coordination control integrated charger of an electric vehicle, wherein the method comprises:
step 1), initializing system data, wherein system parameters and configuration data are loaded and parsed;
step 2), loading sub-functions, wherein the sub-functions are configured to implement an operating log module, a data model module, a system alarm processing module, a billing processing module, a charging requirement acquiring module, and a charging strategy executing module;
wherein the operating log module records a system operating status, abnormal data, and abnormal process operation during an operation in a real time way; and a log is divided into four levels comprising a debug log, a general information log, an alarm information log, and an error information log;
wherein the data model module reads and writes test point data in a real time way, where the test point data includes a mount of data and signal acquired by each of devices of a device layer;
wherein the system alarm processing module collects and processes various alarm information during the operation of the system, notifies a related module to process the alarm in a real time way, and analyzes and processes abnormal data and abnormal four-remote data during the operation of the system;
and wherein the billing processing module records a fee generated by the system in a process of charging;
and step 3), customizing an optimal strategy, wherein a charging requirement acquiring module transmits a charging requirement to an optimal strategy customization module, the optimal strategy customization module provides a strategy customization result to a charging strategy executing module, the charging strategy executing module feeds back an execution result to the optimal strategy customization module, and the optimal strategy customization module feeds back the result to the charging requirement acquiring module; and
wherein the optimal strategy customization module has four operating states comprising a stop state for inspection, a state of starting charging, an inspection state during charging, and a state of stopping charging, the optimal strategy customization module generates an optimal strategy by analyzing data provided by a data model module and a system alarm processing module, and performs a function of optimal strategy customization; in a case that it is determined that the operating state is switched, the operating states are switched in response to a determination result of switching the operating state; an interface of a system log module is called, and an operating log is recorded; and a billing processing module is called, and a charging record is generated.

2. The method for monitoring the multi-output coordination control integrated charger of the electric vehicle according to claim 1, wherein the inspection state during charging of the optimal strategy customization module in the step 3 comprises:
step (1), starting an inspection during charging;
step (2), determining whether there is an alarm module, and going to step (4) in the case that there is the alarm module; and going to step (3) in the case that there is not the alarm module;
step (3), sending a single module stop command, determining whether the single module is successfully stopped; going to step (4) in the case that the single module is successfully stopped; and going to step (13) in the case that the single module is not stopped successfully;
step (4), determining whether an output of an activated module is not greater than a requirement; going to step (6) in the case that the output of the activated module is not greater than the requirement; and going to step (5) in the case that the output of the activated module is greater than the requirement;
step (5), determining whether a single inactivated charging module is available; going to step (7) in the case that the single inactivated charging module is available;

and going to step (13) in the case that no single inactivated charging module is available;

step (6), determining whether a real-time output is greater than the requirement; and going to step (8) in the case that the real-time output is greater than the requirement;

step (7), determining whether the single module is successfully activated; going to step (6) in the cast that the single module is successfully activated; and going to step (13) in the cast that the single module is not activated successfully;

step (8), determining whether the single module is not required to be inactivated; activating the single module in the case that the single module is required to be inactivated; and going to step (9) in the case that the single module is not required to be inactivated;

step (9), determining whether it is not required to reset the output; going to step (11) in the case that it is not required to reset the output; and setting a voltage and current and going to step (12) in the case that it is required to reset the output;

step (10), determining whether the single module is successfully inactivated; going to step (9) in the case that the single module is successfully inactivated; and going to step (13) in the case that the single module is not inactivated successfully;

step (11), determining whether the inspecting during charging is continued; going to step (13) in the case that the inspection during charging is not continued;

step (12), determining whether the setting is successful; going to step (11) in the case that the setting is successful; going to step (13) in the case that the setting is not successful; and step (13), stopping charging.

3. The method according to claim 1, wherein the system for monitoring a multi-output coordination control integrated charger of an electric vehicle, comprises:
   a central control layer, configured to obtain an operation on a user interface and query system information;
   a data processing layer, configured to customize a specific application, wherein the specific application includes: strategy customization, system alarm, billing, data model, system operating log;
   a data communication layer, configured to establish a communication link, and data transmit and receive data; and
   a device layer, configured to acquire data from a charging module and multiple output power ports of the multi-output coordination control integrated charger of an electric vehicle, and distribute data on multiple paths to the data processing layer through the data communication layer;
   wherein the data processing layer comprises:
   the optimal strategy customization module, configured to form the optimal strategy based on the charging requirement and an activated status of the charging module, and issue the optimal strategy to a related module; wherein operating states of the optimal strategy customization module comprises the stop state for inspection, the state of starting charging, the inspection state during charging, and the state of stopping charging.

4. The method according to claim 3, wherein the data processing layer further comprises:
   the system alarm processing module, configured to collect and process various alarm information during an operation of the system, and notify a related module to process the alarm in a real time way;
   the billing processing module, configured to record a fee generated by the system in a process of charging;
   the data model module, configured to process data interaction, wherein the data model module obtains data acquired by a charging requirement acquiring module and issues control data to a charging strategy executing module; and
   the operating log module, configured to collect system operation status, and provide a basis of a system maintenance, wherein a log is divided into four levels comprising a debug log, a general information log, an alarm information log, and an error information log.

5. The method according to claim 4, wherein the data processing layer further comprises:
   a charging requirement acquiring module configured to obtain a required voltage and current in a real time way, wherein the charging requirement acquiring module obtains requirement information of BMS of the charged vehicle in a real time way through a CAN bus, and provides a real-time output of the system and a system status variable; and
   a charging strategy executing module configured to execute an optimal output strategy, wherein the charging strategy executing module monitors and controls a charging module in a real time way through a CAN bus, a RS485 bus, or a RS422 bus; and provides real-time data of the charging module; if a failure, comprising under-voltage, over-current, short circuit, and overheating, happens to the charging module, a failure alarm signal is outputted.

6. The method according to claim 3, wherein the data processing layer further comprises:
   the charging requirement acquiring module configured to obtain a required voltage and current in a real time way, wherein the charging requirement acquiring module obtains requirement information of BMS of the charged vehicle in a real time way through a CAN bus, and provides a real-time output of the system and a system status variable; and
   the charging strategy executing module configured to execute an optimal output strategy, wherein the charging strategy executing module monitors and controls a charging module in a real time way through a CAN bus, a RS485 bus, or a RS422 bus; and provides real-time data of the charging module; if a failure, comprising under-voltage, over-current, short circuit, and overheating, happens to the charging module, a failure alarm signal is outputted.

7. The method according to claim 3, wherein
   in the stop state for inspection, whether the charging module is activated or inactivated is monitored, and a maximum available output voltage and current is calculated in a real time way;
   in the state of starting charging, a charging module is provided to perform a charging operation, according to a required voltage, a required current and a maximum output voltage and current of the charger at a present moment, where in the state of starting charging, a function of starting a single module and a function of starting multiple modules are provided;
   in the inspection state during charging, a situation of the charging module in an operation process is monitored in a real time way; and
   in the state of stopping charging, a charging operation of a charging module, which is providing an output, is stopped.

8. The method according to claim 7, wherein the inspection state during charging comprises the following four situations:

in a case that a failure alarm signal of the charging module is received, and it is determined to stop a failed charging module by analyzing and processing the failure alarm signal, a charging module to be stopped is switched into a state of stopping charging, and a new voltage and current distribution strategy is provided to the charging strategy executing module;

in a case that a maximum output of an activated module does not meet a requirement, an available standby charging module is provided;

in a case that minimum output power of the activated module is greater than required power, a part of output modules is stopped; and in a case that output power is not equal to the required power, the output power is dynamically regulated in a real time way.

9. The method according to claim 3, wherein the inspection state during charging comprises the following four situations:

in a case that a failure alarm signal of the charging module is received, and it is determined to stop a failed charging module by analyzing and processing the failure alarm signal, a charging module to be stopped is switched into a state of stopping charging, and a new voltage and current distribution strategy is provided to the charging strategy executing module;

in a case that a maximum output of an activated module does not meet a requirement, an available standby charging module is provided;

in a case that minimum output power of the activated module is greater than required power, a part of output modules is stopped; and in a case that output power is not equal to the required power, the output power is dynamically regulated in a real time way.

* * * * *